Inventor
Neil P. Larsen
By Bates Golrick & Teare
Attorneys

Jan. 23, 1934.  N. P. LARSEN  1,944,439
MOTOR VEHICLE BODY CONSTRUCTION
Filed April 12, 1933  3 Sheets-Sheet 2
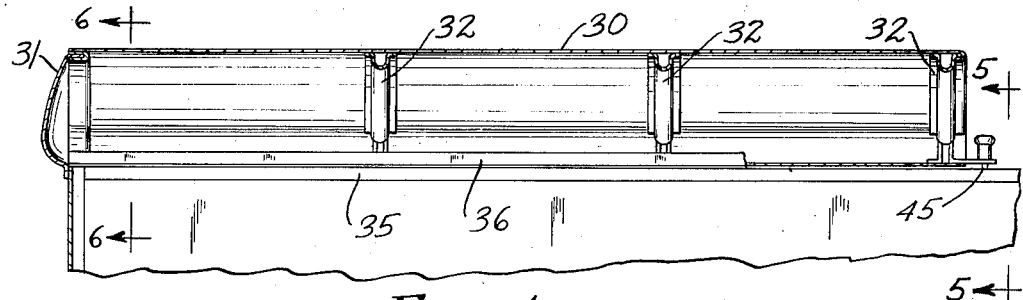
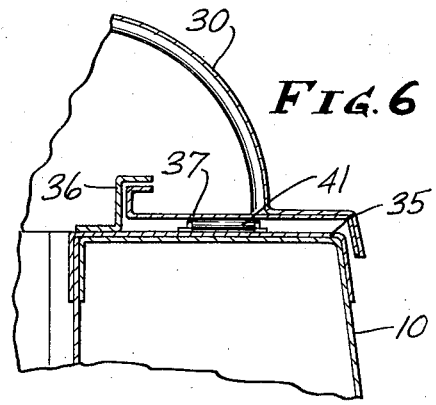
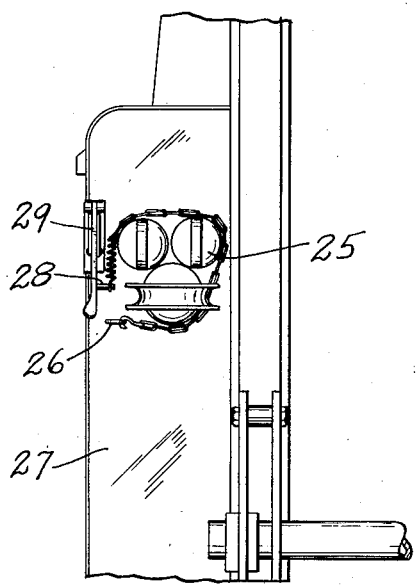
Inventor
Neil P. Larsen
By Bates Goldrick & Teare
Attorneys Patented Jan. 23, 1934

1,944,439

UNITED STATES PATENT OFFICE 1,944,439

MOTOR VEHICLE BODY CONSTRUCTION

Neil P. Larsen, Cleveland, Ohio, assignor to American Coach and Body Company, Cleveland, Ohio, a corporation of Ohio Application April 12, 1933. Serial No. 665,769

4 Claims. (Cl. 296—24)

My invention relates to motor vehicle bodies, particularly to those, which are used by public utility companies. Such organizations require the use of a derrick that is mounted on a truck, and that projects a considerable distance above the roof. It is desirable to extend the derrick rearwardly so as to utilize the weight of the engine, as a counterweight, but such arrangement was considered impractical, as it necessitated holes in the roof for one of the supporting legs and the hoisting cable. Consequently the practice has been to mount the derrick on the forward end of the truck. This arrangement however, is objectionable for the weight of the motor is not spaced sufficiently far from the points of connection between the forward legs of the derrick and the truck frame to lift the desired loads at a predetermined radius.

A further consideration in connection with the design of truck bodies for this class of work is the fact that the long articles, such as derrick legs, pike poles and ladders may be carried without seriously interfering with means of access to the driver's seat, and without protruding laterally beyond the rails of the truck body.

The present invention therefore, is directed toward a construction of a truck body, which permits the derrick to be erected adjacent the rearward end of the truck, and which permits long articles to be carried in a safe and convenient manner.

Figure 1:
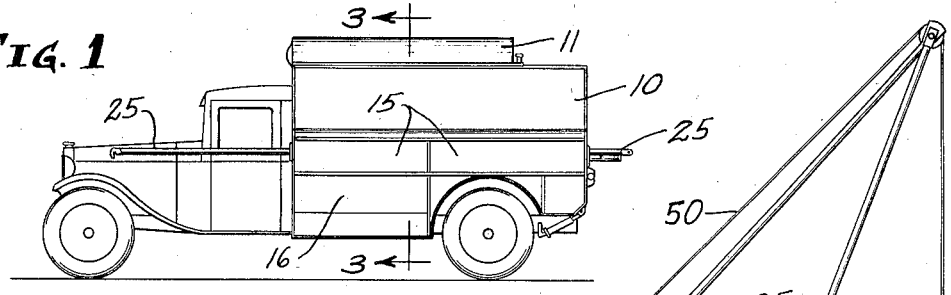
Figure 2:
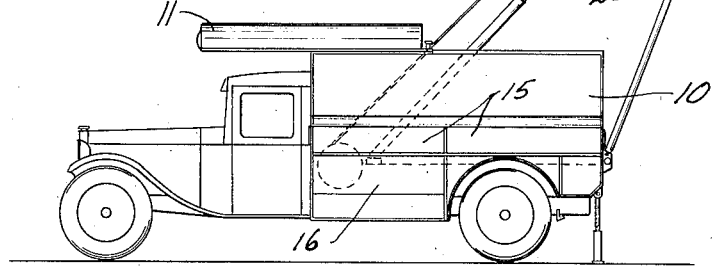
Figure 3:
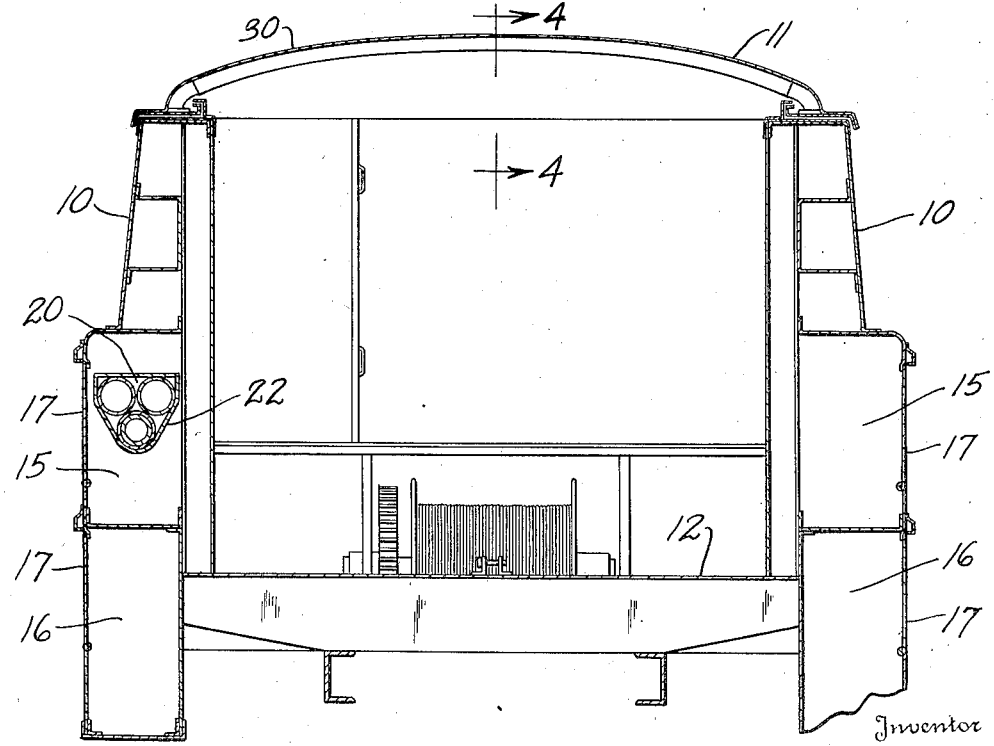
Figure 9:
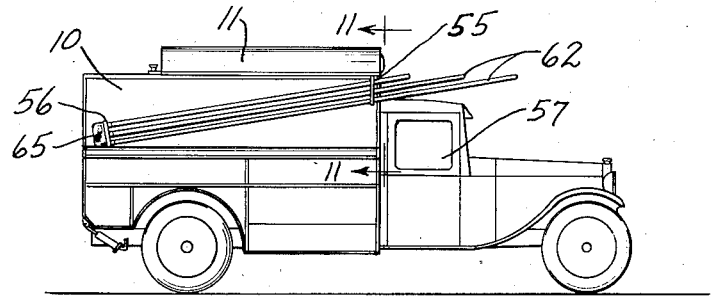
Figure 11:
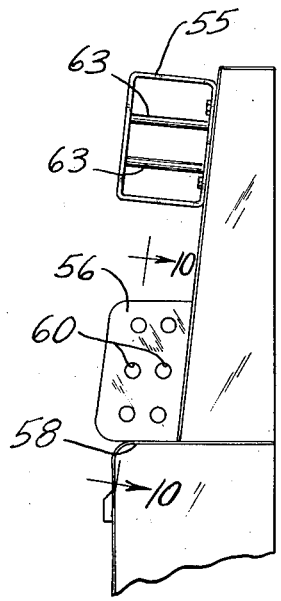
Figure 10:
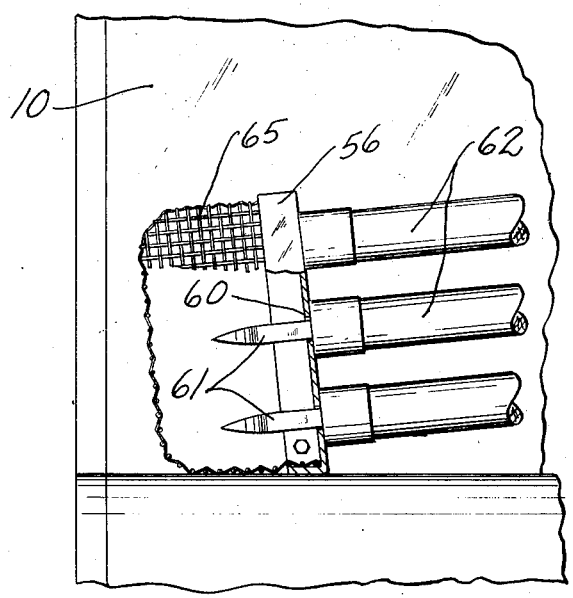

Referring now to the drawings, Fig. 1 is a side elevation of a truck body having my invention; Fig. 2 is a similar elevation showing the roof moved forwardly and illustrating a derrick in the erected position; Fig. 3 is a section taken on an enlarged scale on the line 3—3 in Fig. 1, and Fig. 4 is a section taken on the line 4—4 in Fig. 3; and Fig. 5 is an enlarged sectional view taken on the line 5—5 in Fig. 4; Fig. 6 is a sectional view taken on the line 6—6 in Fig. 4, and Fig. 7 is a section taken on the line 7—7 in Fig. 5; Fig. 8 is an end elevation of part of the truck body showing a detail of the fastening device for holding the derrick legs in stored position. Figs. 9, 10 and 11 illustrate details of a pike pole support mounted on the side of the vehicle body.

Field work of public utility companies necessitates the use of equipment for handling telephone poles, heavy transformers and other articles of similar nature. Such equipment includes pike poles and derrick and suitable compartments for tools and equipment, while allowing sufficient space within the truck for men to work.

The present invention provides a truck body in which the long articles may be conveniently carried and in which the derrick may be erected at the rearward end of the truck without necessitating the use of holes in the roof. To this end, the motor vehicle has a body wherein the sides are designated 10, a roof 11 and a floor 12. The sides are hollow and provide tool compartments 15 and 16, access to which is provided from the exterior part of the body. A door 17 is provided for each tool compartment.

To carry the derrick within the confines of the lateral dimensions of the truck, and at the same time to maintain them in compact relationship, I provide a hollow passageway 20 through the tool compartments 15 on one side of the body. This passageway may be formed of a sheet metal plate 22 which is bent to enclose the desired number of derrick legs, and is rigidly fastened as by welding to the forward and rearward end walls of the body. It is to be understood that the end walls are provided with openings which correspond to the shape of the plate, and that the ends of the plate are welded to the end walls, for otherwise suitable fastened to make a water proof joint therewith, thus the derrick legs 25 may extend through the passageway, and project beyond each end of the body. In this way, the derrick is maintained in compact relationship within the confines of the tool compartments.

To lock the derrick in the passageway or compartment 20, I have shown a chain 25 one end of which is anchored as at 26 to an end wall 27 while the other end is adapted to be hooked onto a pin 28 which in turn may be pulled tightly into locking position by manipulation of a hand lever 29 shown in Fig. 8.

To permit the derrick to be erected at the rearward end of the truck without requiring holes to be cut in the roof, I provide a roof which is movably mounted on a trackway that is formed at the top of the two side members. The roof, as shown, comprises an arched metallic plate 30 that is open at the rearward end and is preferably closed by a plate 31 at the forward end. It is preferably reinforced by transversely extending ribs 32 which may be hollow rolled members of substantially U-shaped cross section, and which may be fastened to the underside of the roof plate by a welding operation.

The trackway may be formed by horizontal plates 35, which cover the hollow sides, and by Z-bars 36 which are fastened on the plates and which extend lengthwise of the body. The roof then has a laterally extending portion in the form of plates 37 which extend inwardly and beneath the outwardly extending part of the Z-bars. Rollers 40 may be journalled in the roof adjacent the rearward end thereof for engagement with the plate 35, while other rollers 41 may be journalled in the bearings, that are carried by the trackway plates 35, adjacent the forward end of the body.

To hold the roof in any desired position, I have shown a spring pressed plunger 45, which is carried by the roof and which is adapted to extend through openings 46 in the trackway. This locking feature is advantageous in that it enables the roof to be held at any desired position. Thus, for example, the roof may be moved forwardly only a relatively short distance, and as a result, a current of air will be forced under the roof and will provide adequate ventilation within the body while the truck is in motion. Furthermore, the roof when moved to the extreme limit of forward movement, as is shown in Fig. 2, will provide adequate space for the erection of the derrick and the operation of the hoist cable 50.

Part of the equipment used by public utility companies includes pike poles, which are usually longer than the truck body, and are provided with metallic points that are inserted in the ends of the poles. To carry this equipment safely within the confines of the truck body and at the same time to permit the door to the driver's compartment to be opened in the usual manner, I have shown pike pole supports as mounted on the side of the body, and as comprising brackets 55 and 56. The forward bracket 55 is disposed above the level of the top of the door 57, while the rearward bracket is disposed below the level of the upper bracket and adjacent the ledge 58 which forms the top of one of the tool compartments 15. Thus the poles are supported in an inclined position, and are urged by gravity into contact with the rearward bracket. As a further means for holding the poles in spaced relationship, I have shown openings 60 in the rearward bracket for receiving the pointed ends 61 of the poles 62, and I have shown spacer bars 63 on the forward bracket as is illustrated particularly in Fig. 11. A wire guard 65 is placed around the back of the plate 56 to prevent injury by contact with the exposed points on the pike poles.

While I have shown and described my invention, as being particularly adapted for use in connection with motor vehicle bodies, it is to be understood that it is not to be restricted to such use, but that the form shown is merely illustrative of the invention.

I claim:

1. A vehicle having a cab and a body at the rear thereof, the body having a tool compartment on the side thereof and a hollow member extending completely through the compartment in a direction longitudinally of the body and below the normal level of the line of vision of a driver in the cab, said member providing a passageway for supporting articles, longer than the body, within the lateral confines of the compartment.

2. A vehicle having a cab and a body at the rear thereof, the body having a compartment in the side thereof and below the normal level of the line of vision of a driver in the cab, a closure for the compartment, the compartment having forward and rearward end walls, a hollow member in the compartment behind the closure, and openings in the end walls in communication with the member, whereby articles longer than the body may be supported by the member while projecting alongside the cab.

3. A vehicle having a cab and a body at the rear thereof, the body having a plurality of tool compartments disposed thereon in tandem relationship and below the normal level of the line of vision of a driver in the cab, a hollow continuous member extending completely through the compartments and terminating in the outer end of the compartments and being open at each end, whereby articles longer than the combined length of the compartments may be inserted therein while maintaining them within the lateral confines of the compartments.

4. A vehicle having a cab and a body at the rear thereof, the body having a plurality of compartments disposed thereon in tandem relationship and below the normal level of the line of vision of a driver in the cab, a closure for each compartment and a hollow member extending through the compartments and terminating in the extreme forward and rearward walls of the compartments and being spaced from the top and bottom walls of the compartments, said member providing a receptacle into which articles longer than the body may be inserted without requiring the closure to be opened and without disturbing the contents of the compartments.

NEIL P. LARSEN.